US010231577B2

(12) United States Patent
    Safar

(10) Patent No.: US 10,231,577 B2
(45) Date of Patent: Mar. 19, 2019

(54) DEVICE FOR MAKING DOMED GRILLED HAMBURGER

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 247 days.

(21) Appl. No.: 15/458,188

(22) Filed: Mar. 14, 2017

(65) Prior Publication Data
    US 2018/0263422 A1  Sep. 20, 2018

(51) Int. Cl.
    *A22C 7/00*    (2006.01)
    *A47J 43/20*   (2006.01)

(52) U.S. Cl.
    CPC .............. *A47J 43/20* (2013.01); *A22C 7/0053* (2013.01)

(58) Field of Classification Search
    CPC .. A47J 43/20; A47J 27/14; A47J 36/34; A47J 27/00; A47J 27/13
    See application file for complete search history.

(56) References Cited

U.S. PATENT DOCUMENTS 5,948,313 A * 9/1999 Cahen ................. A21B 3/13
                                                    249/160

* cited by examiner

*Primary Examiner* — Joseph S Del Sole
    *Assistant Examiner* — John Robitaille

(57) ABSTRACT

The present invention provides an apparatus for preparation of grilled domed hamburger patties. The apparatus cooks hamburger patty evenly on the inside, suitable for various gradations of doneness, such as rare, medium rare, medium, medium well, and well done. It also keeps the thickness of the hamburger patty of uniform size and reduces the shrinkage of the hamburger patty in diameter. The excess melted fat is allowed to drain off while making it less greasy. The patty remains juicy and uniformly cooked and the device prevents the charcoaling appearance of the hamburger patty.

6 Claims, 4 Drawing Sheets

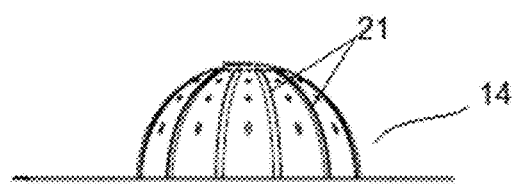
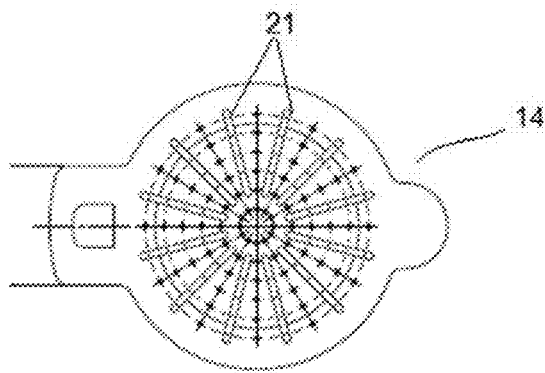
FIG. 7  FIG. 8
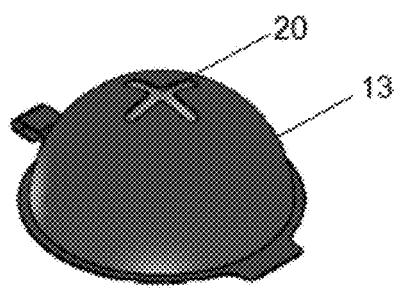
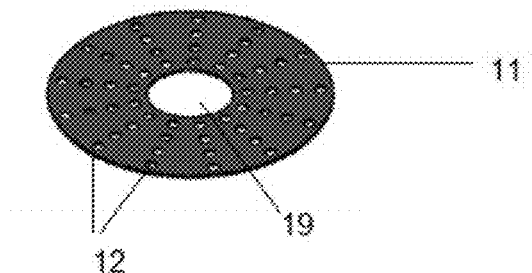
FIG. 9  FIG. 10

DEVICE FOR MAKING DOMED GRILLED HAMBURGER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of devices for preparation, formation and cooking of articles of food, and more particularly relates to a novel device for cooking grilled, dome shaped hamburger patties.

BACKGROUND OF THE INVENTION

While preparing grilled hamburger meat patties, it is important that the meat is cooked uniformly, not undercooked or overburnt and also remains juicy within. The problem usually faced while cooking them is that the patties are cooked well on the outside but not cooked uniformly in the inside, especially the central portion of the patty. Another effect of the uneven cooking is that the hamburger patties shrink in the inner central portion. When the melted fat or grease from within the hamburger patty runs outside onto the charcoal, it causes a high flame that often results in blackening of the exterior surface of the hamburger patty. Also the grease accumulated on the external surface of hamburger patty makes it rather unappetizing and unhealthy to eat. There is also the issue of "charcoaling" of the hamburger patty which is caused by grilling with high flames.

Below are given some of the known prior art.

U.S. Pat. No. 5,596,922 entitled "Apparatus for cooking a food product" describes an apparatus for cooking a food product, for example a hamburger, comprising a mould assembly for cooking the hamburger. The mould assembly is formed from first and second moulds formed on upper and lower bodies. When the moulds are moved apart spaces between the side wall portions allow the hamburger to be easily removed. The apparatus aims for easy removal of the hamburger from the mould.

Patent CA2272151 entitled "PATISAFE" elaborates that hamburger patties that are prepared through mass-production must be well cooked but not burned and should also remain juicy. To ensure that the hamburger meat is well cooked, the amount of heat should be adjusted to the thickness of the patties. Another way to cook the patties properly is to adjust the thickness of the patties to the amount of heat available. The disclosed invention is based on matching the thickness of the meat patties to the amount of heat available from cooking facilities.

U.S. Pat. No. 8,701,552 entitled "Forming device for articles of food" describes methods and devices configured for forming exterior portions and interior portions of a food article so as to form a cavity for placement of similar or different articles of food therein.

U.S. Pat. No. 7,640,929 entitled "Barbecue grill cooking chamber with grease control structures" discloses a barbecue grill assembly comprising a cooking chamber with a cover and a firebox.

U.S. Pat. No. 5,112,634 entitled "Method and apparatus for making ground meat patties" discloses a household hamburger maker having a hollow, circular outer collar and a hand-held center plug. Ground meat is placed into the hollow area of the outer collar, and the center plug is inserted into the same hollow area and pressed down against the ground meat. While the center plug is being pressed down, it is also twisted alternately clockwise and counterclockwise, which produces a smooth top surface on the ground meat as it is shaped into a hamburger patty. While still being twisted, the center plug is pulled back up and away from the hamburger patty, leaving behind a correctly-shaped patty that has a smooth top surface.

Despite various improvements and progress in the field, some of the major obstacles that still exist are presented herein below. The existing devices are unable to overcome the limitations of providing a dome shaped hamburger patty cooked on a grill, which is uniformly cooked, does not exhibit "charcoaling" of the exterior surface, does not have fat or grease run off and accumulate outside the patty and is also juicy on the inside. Besides the existing apparatus are not simple to use or manufacture. Accordingly, improvements are needed in the existing devices that negate the above shortcomings.

It is observed that the purpose and methodology of all the above inventions that are part of prior art do not envisage the unique embodiment of an apparatus for preparation of dome shaped hamburger patty cooked by grilling, as described in the present application.

The scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide a a novel device for cooking grilled, dome shaped hamburger patties.

Another objective of the present invention is to provide a device capable of preparing grilled, dome shaped hamburger patties that are uniformly cooked, do not have grease or fat accumulated on the outside and are juicy within.

Another objective of the present invention is to provide a device such that the hamburger patties do not have a burnt, "charcoaled" appearance caused by high flames. Yet another objective is to provide a device that can be used to prepare hamburger patties that exhibit minimum shrinkage.

The invention described herein thus comprises a novel device for preparation of dome-shaped, grilled hamburger patty. The device comprising:
  (a) a bottom dome member configured substantially in the shape of a hemispherical dome with a flat plate running around a circumferential peripheral edge, said bottom dome member characterized by a plurality of openings, (b) a top dome member configured substantially in the shape of a hemispherical dome, said top dome member characterized with a central opening on a vertex region of the top dome member, (c) a top flat plate member non-removably affixed vertically above the top dome member, said top flat plate characterized by a plurality of radially arranged openings and a central opening, wherein said bottom dome member and said top dome member are conjoined with a pair of height adjustable locking members and an opening locking member, said pair of the height adjustable locking members and the hinged locking member provided on diametrically opposite locations on the flat plate, and said bottom dome member and said top dome member capable of holding a hamburger patty between them.

The above summary is intended to illustrate exemplary embodiments of the invention, which will be best understood in conjunction with the detailed description to follow, and are not intended to limit the scope of the invention. Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

DESCRIPTION OF THE DRAWINGS

FIG. 7 is a side view of the bottom dome member.

FIG. 8 is a top view of the bottom dome member.

FIG. 9 is a perspective view of the top dome member.

FIG. 10 is a perspective view of the top flat plate member.

Figure 1:
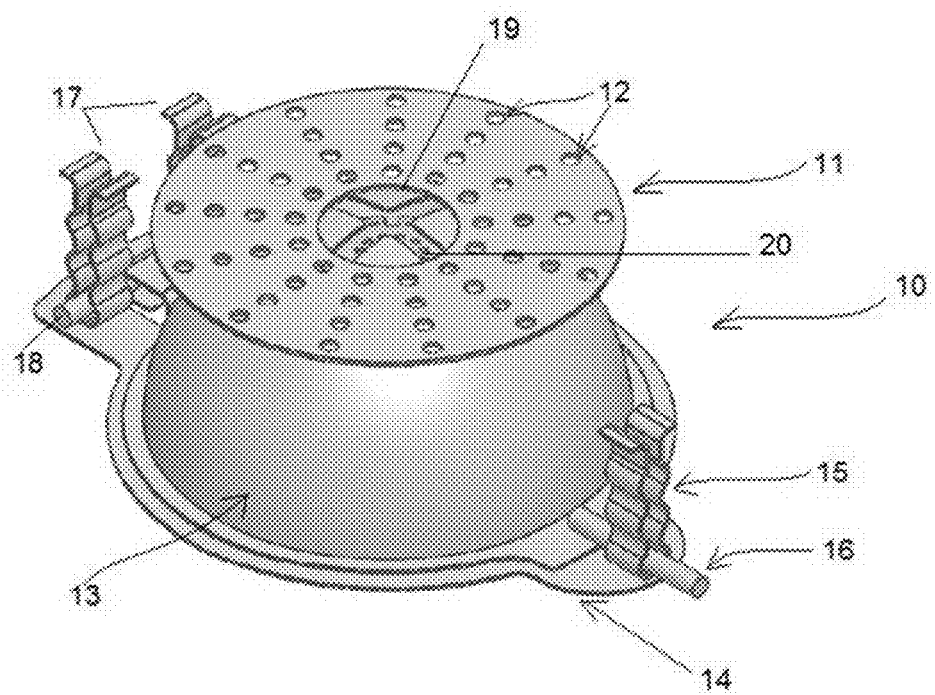
FIG. 1 is an illustrative perspective view depicting an embodiment of the present invention.

LIST OF REFERENCE NUMBERING 10 labels a device for making domed grilled hamburger in accordance with the present invention
11 labels a top flat plate member
12 labels a plurality of radially arranged openings of the top flat plate member 11
13 labels a top dome member
14 labels a bottom dome member
15 labels an opening locking member
16 labels a rod corresponding to the opening locking member 15
17 labels a pair of height adjustable locking members
18 labels a rod corresponding to the pair of height adjustable locking members 17
19 labels a central opening of the top flat plate member
20 labels a central opening on a vertex region of the top dome member
21 labels a plurality of openings of the bottom dome member
30 labels a hamburger patty

DETAILED DESCRIPTION OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

The invention described herein thus comprises a novel, device for making dome shaped, grilled hamburger patties. Said device is capable of preparing hamburger patties that are uniformly cooked, exhibit good appearance and do not have excess fat on the surface. The device comprises:

a bottom dome member configured substantially in the shape of a hemispherical dome with a flat plate running around a circumferential peripheral edge, said bottom dome member characterized by a plurality of openings, a top dome member configured substantially in the shape of a hemispherical dome, said top dome member characterized with a central opening on a vertex region of the top dome member, a top flat plate member non-removably affixed vertically above the top dome member, said top flat plate characterized by a plurality of radially arranged openings and a central opening, wherein said bottom dome member and said top dome member are conjoined with a pair of height adjustable locking members and a corresponding rod, and an opening locking member and a corresponding rod, said pair of the height adjustable locking members and the opening locking member non-removably attached to and provided on diametrically opposite locations on the flat plate running around the circumferential peripheral edge of the bottom dome member, and, said bottom dome member and said top dome member adapted to receive a hamburger patty between them.

The bottom dome member and top dome member are shaped such that the hamburger patty conforms substantially to the curvature of the bottom and top dome members and is molded accordingly.

FIG. 1 depicts a perspective view of a device depicting an embodiment of the present invention. The device 10 comprises a bottom dome member 14, a top dome member 13, and a top flat plate member 11. The bottom dome member 14 is shaped substantially like a hemisphere, with a flat plate running along the circumferential edge. The hemispherical dome like structure and the peripheral flat plate are an integral structure. A plurality of openings 21 is present on the bottom dome member 14. These openings may be provided as slots or small holes in a symmetric fashion.

An opening locking member 15 and its corresponding rod 16 are non-removably attached to one point on the flat plate portion of the bottom dome member 14. Pair of height adjustable locking members 17 and a corresponding rod 18 are non-removably attached on the flat plate portion of the bottom dome member 14, at a diametrically opposing region to where opening locking member 15 and its corresponding rod 16 are provided. 17 and 18 function as a hinged mechanism, when 16 is raised upwards to open the top dome member 13 for placing the hamburger patty. The top dome member 13 is positioned vertically above the bottom dome member 14 and conjoined by opening locking member 15 at one point and height adjustable locking members 17 on the diametrically opposite side. The position of the locking members can be adjusted according to the desired thickness of the hamburger patty. Excessive heat causes the metal body of the device to expand and makes it difficult to use any other mechanism for opening and adjusting the height of the device members and also be simple enough for a user (cook) to use.

The present mechanism of height adjustable locking members 17, the corresponding rod 18, opening locking member 15 and the corresponding rod 16 is the most preferred embodiment to adjust to adjust to the spacing between the top dome member 13 and bottom dome member 14 as per desired thickness of hamburger patty such that the user (cook) can release and lock with ease.

The top dome member 13 is provided with a central opening or slot 20 on its top vertex region. This is to drain out excess fat or grease generated from the patty while grilling. Also the slot 20 helps in controlling the metal expansion i.e. warping because of excessive heat on the top dome member 13 and thereby keeps it in shape. The slot 20 thus controls the heat transfer and prevents warping of the top dome member 13.

In alternate embodiments, the slot 20 may be provided in the form of a plurality of symmetric geometric openings.

The top flat plate member 11 is non removably connected, by means such as welding, to the top dome member 13 and is provided for support and stability to the whole device. A user can flip the device upside down for uniform cooking and the device remains stable. The plurality of radially arranged openings of the top flat plate member 11 lead to uniform heat distribution.

Figure 2:
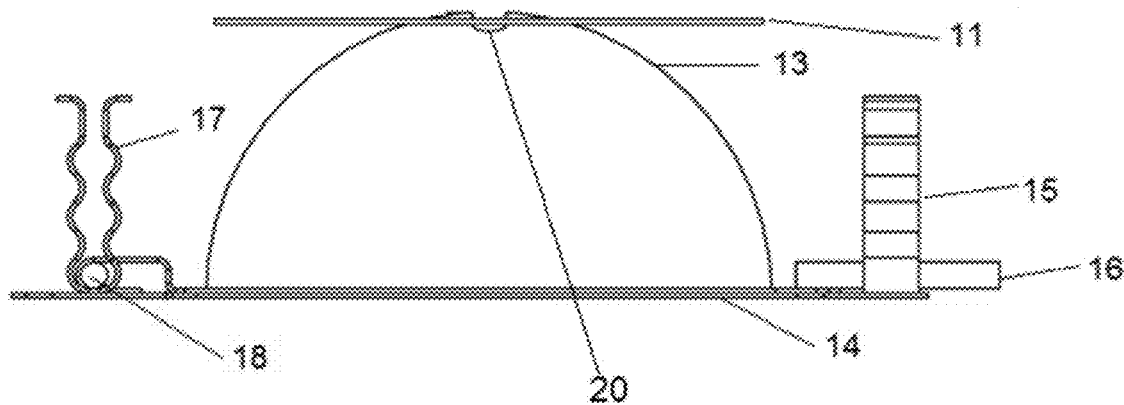
FIG. 2 is a front side view of a device, according to the present invention.
Figure 3:
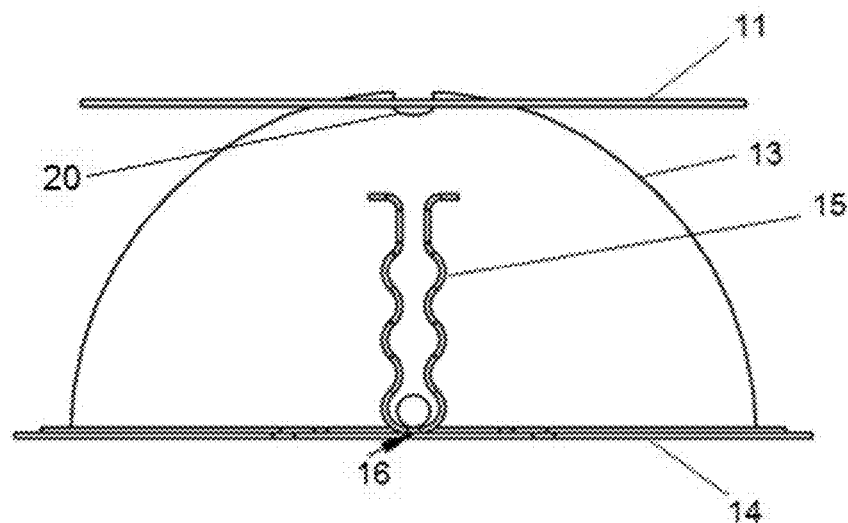
FIG. 3 is a right side view of a device, according to the present invention.
Figure 4:
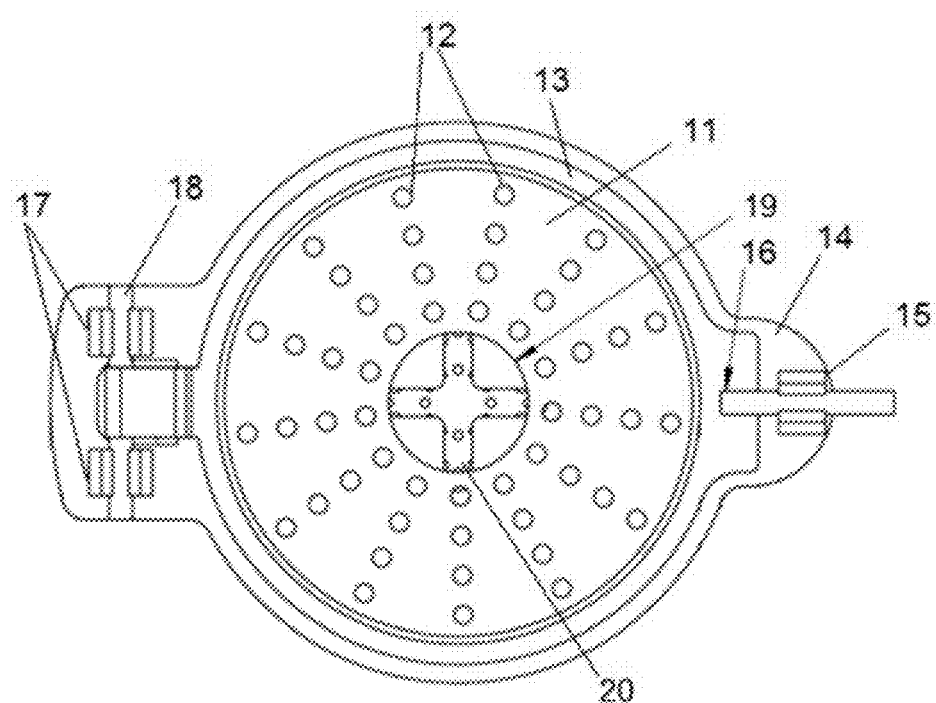
FIG. 4 is a top view of a device, according to the present invention.
Figure 5:
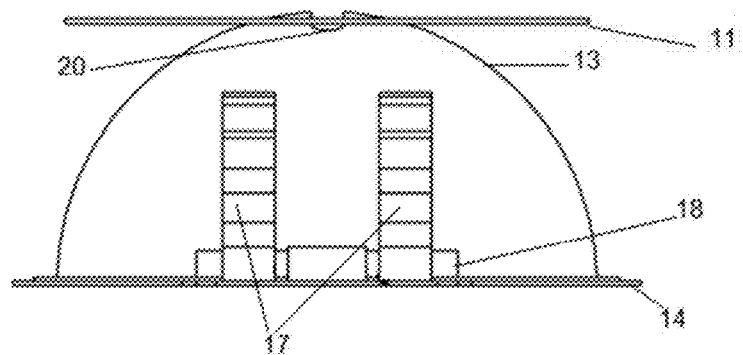
FIG. 5 is a left side view of a device, according to the present invention.

FIG. 2 depicts a front side view of the device in accordance with the present invention. FIG. 3 is a right side view of a device, according to the present invention. FIG. 4 is a top view of a device, according to the present invention. FIG. 5 is a left side view of a device, according to the present invention.

Figure 6:
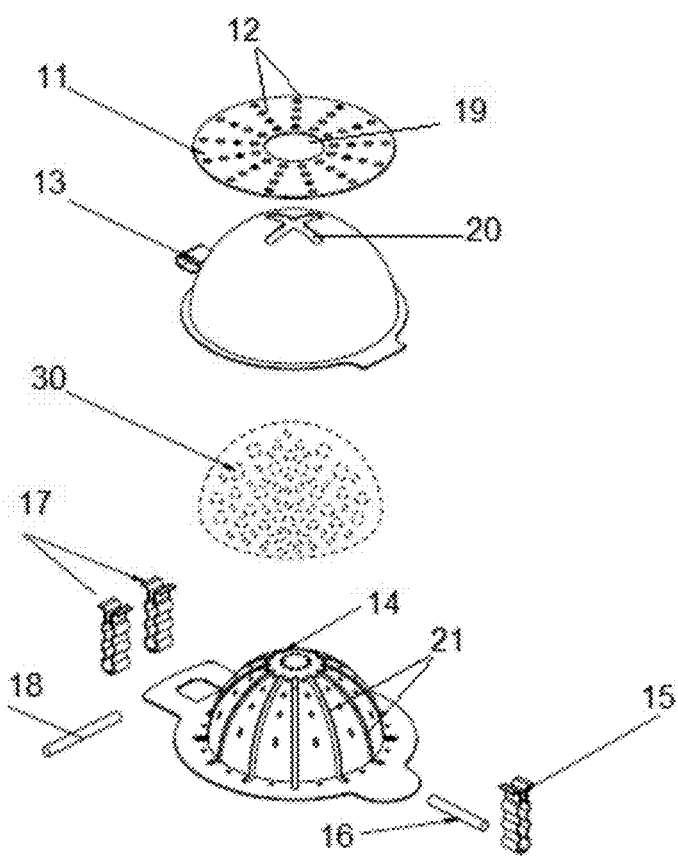
FIG. 6 is an exploded perspective view depicting an embodiment of the present invention.

FIG. 6 is an exploded perspective view depicting an embodiment of the present invention. An illustrative hamburger patty 30 is depicted in broken line between the bottom dome member 14 and the top dome member 13.

FIG. 7 depicts a side view of the bottom dome member 14 provided with a plurality of openings 21. FIG. 8 depicts a top view of the bottom dome member 14.

FIG. 9 depicts a perspective view of the top dome member 13 provided with a central opening 20 on the top vertex region of the hemisphere. FIG. 10 depicts a perspective view of the top flat plate member 11 having a central opening 19 and a plurality of radially dispersed openings 12.

In a preferred embodiment of the invention, the opening on the vertex region of the top dome member is provided in the shape of an X. In a preferred embodiment, the material of all the components is stainless steel.

Experiments were carried out to test the efficiency of the present invention and are tabulated as below. The following experimental trials were carried out using a device according to the present invention with the following specifications. As seen from the results, the overall shrinkage in diameter of the hamburger patty is in the range of 5% to 23%.

TABLE 1

Specifications of the device

| | |
|---|---|
| Top dome diameter (inches) | 3.6 |
| Bottom dome diameter (inches) | 3.5 |
| Height of top dome (inches) | 0.71 |
| Height of bottom dome (inches) | 0.91 |
| Top dome surface area | 11.76 square inch |
| Bottom dome surface area | 12.33 square inch |
| Open area of top dome | 1.32 square inch |

TABLE 2

Experiment results

| Parameter | Standard test conditions using a Charcoal grill from Weber (model 741001 Original Kettle 22 inch charcoal grill) | Test condition 1 using the present invention | Test condition 2 using the present invention |
|---|---|---|---|
| Hamburger patty fat content (Costco brand ¼ lb frozen hamburger patty) | 88% lean 12% fat | 88% lean 12% fat | 88% lean 12% fat |
| Weight before cooking | 4.25 oz | 4.25 oz | 4.25 oz |
| Thickness of the hamburger patty before cooking | 0.69 in | 0.69 in | 0.69 in |
| Diameter of the hamburger patty before cooking | 3.74 in | 3.74 in | 3.74 in |
| Grill cover on/off | Off | Off | Off |
| Grill temperature | 464 F. | 464 F. | 464 F. |
| Middle temperature | 132 F. | 143 F. | 165 F. |
| Side temperature | 161 F. | 135 F. | 143 F. |
| Cooking time | 10 min flipped | 10 min not flipped | 10 min flipped |
| Appearance of cooked hamburger patty | Charcoaled and shrunk | Gray at bottom | Looks good |
| Diameter of cooked hamburger patty | 2.7 in | 2.9 in | 3.5 in |
| Thickness of cooked hamburger patty | 1.34 in | 0.67 in | 0.91 in |
| Weight of cooked hamburger patty | 3.8 oz | 3.5 oz | 3.5 oz |
| % Diameter shrinkage | 28% | 23% | 5% |
| Doneness gradation | Rare | Medium | Medium well |
| Color of cooked hamburger patty | Charcoal | Gray | Gray |
| Shape of cooked hamburger patty | Not uniform | Uniform | Uniform |
| Taste of cooked hamburger patty | Just OK | Good | Good |
| Cavity depth | 0 in | 0.4 in | 0.4 in |
| % of open top open area | 100% | 10% | 10% |

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A cooking device for preparation of a dome-shaped, grilled hamburger patty, said device comprising:
    a bottom dome member configured substantially in the shape of a hemispherical dome with a flat plate running around a circumferential peripheral edge, said bottom dome member characterized by a plurality of openings,
    a top dome member configured substantially in the shape of a hemispherical dome, said top dome member characterized with a central opening on a vertex region of the top dome member,
    a top flat plate member non-removably affixed vertically above the top dome member, said top flat plate characterized by a plurality of radially arranged openings and a central opening,
    wherein said bottom dome member and said top dome member are conjoined with a pair of height adjustable locking members and a corresponding rod, and an opening locking member and a corresponding rod, said pair of the height adjustable locking members and the opening locking member non-removably attached to and provided on diametrically opposite locations on the flat plate running around the circumferential peripheral edge of the bottom dome member, and
    said bottom dome member and said top dome member adapted to receive a hamburger patty between them.

2. A cooking device as claimed in claim 1 wherein the central opening on the vertex region of the top dome member prevents warping of the device caused by excess heat and also drains out excess melted fat.

3. A cooking device as claimed in any of the claims 1 to 2, wherein the central opening on the vertex region of the top dome member is provided in the form of a plurality of symmetric geometric openings.

4. A cooking device as claimed in any of the claim 1, wherein the material of construction of all components of the device is stainless steel.

5. A cooking device as claimed in any of the claim 1, wherein the device remains stable when flipped vertically upside down.

6. A cooking device as claimed in any of the claim 1, wherein the overall shrinkage in diameter of the hamburger patty is in the range of 5% to 23%.

* * * * *